3,790,535
METHOD OF REGENERATING CHELATE RESINS HAVING MERCURY ADSORBED THERETO
Kensuke Motani, Tokuyama, Tadahiro Kiyotoshi, Tokyo, and Akihiko Nakahara, Tokuyama, Japan, assignors to Tokuyama Soda Kabushiki Kaisha, Yamaguchi-ken, Japan
Filed Oct. 6, 1972, Ser. No. 295,486
Int. Cl. C08g 23/00
U.S. Cl. 260—79
3 Claims

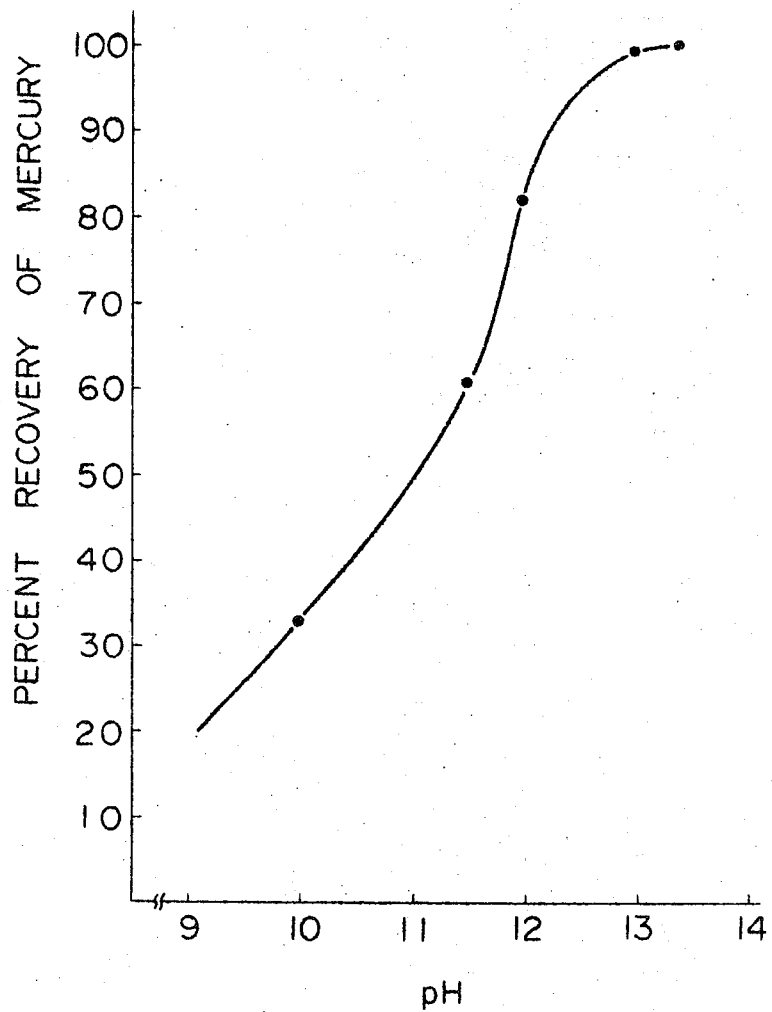

ABSTRACT OF THE DISCLOSURE

A method of regenerating a chelate resin having mercury adsorbed thereto, which comprises contacting the resin with a solution of a sulfide of an alkali metal, barium or ammonium having a pH of at least 11.0, preferably at least 13.0, to thereby liberate the mercury from the chelate resin.

---

This invention relates to a method of regenerating chelate resins which have adsorbed mercury. More specifically, it relates to a method of regenerating a chelate resin containing mercury adsorbed thereto, which comprises contacting the chelate resin with a solution of a certain sulfur-containing compound, to thereby liberate the adsorbed mercury with good efficiency.

Mercury is extremely harmful to man, and therefore, it is necessary to recover mercury contained in factory wastes before disposal.

A method has previously been known which comprises contacting a waste liquor containing mercury with an anion exchange resin, to remove mercury by ion exchange (see U.S. Pats. 3,085,859 and 3,213,066). This method, however, is not satisfactory in that the recovery of mercury from the waste liquor is not sufficient, and the method is applicable only when the mercury is in a specified form.

It has recently been proposed to recover mercury from a mercury-containing waste liquor by contacting the liquor with a chelate resin to thereby cause the resin to adsorb mercury. This method is superior to the method using an anion exchange resin in that mercury contained in the waste liquor can be substantially completely removed and that the method is applicable irrespective of the form of the mercury present in the waste liquor.

While the anion exchange resin used for mercury recovery can be regenerated merely by washing it with hydrochloric acid, nitric acid, etc. to remove the ion exchange mercury, most chelate resins having mercury adsorbed thereto cannot usually be regenerated. Therefore, in spite of excellent mercury adsorbing properties, the chelate resin having mercury adsorbed thereto is disposed of as such to great economical disadvantage.

It is therefore an object of this invention to provide an economical method of recovering mercury substantially from a mercury-containing waste liquor.

Specifically, the present invention has as its object a method of easily regenerating a chelate resin having mercury adsorbed thereto.

The above objects of this invention can be achieved by a method which comprises contacting a chelate resin having mercury adsorbed thereto with a solution with a pH of at least 11.0, of at least one sulfur compound of the general formula $$Me_nS_x$$

wherein Me is an alkali metal, barium or ammonium, $n$ is an integer of 1 or 2, $n$ is 2 when Me is an alkali metal or ammonium and $n$ is 1 when Me is barium, and $x$ is an integer of 1 to 5, to thereby liberate the mercury from the chelate resin.

The "chelate resin" is a generic term for resins containing functional groups which form chelated compounds with metals in the solution. In the present invention, any chelate resins which form chelates with mercury may be used. Typical examples of the chelate resin are sulfur-nitrogen-containing chelate resins such as thiourea resins, thiosemicarbazide resins and dithizone resins, sulfur-containing chelate resins such as thiol resins, and other chelate resins such as iminodiacetate resins, etc. Chelate resins having sulfur-containing functional groups have extremely good mercury adsorbing properties. It has previously been impossible to regenerate such sulfur-containing chelate resins, but according to the present invention, the adsorbed mercury can be easily liberated from these chelate resins.

The sulfur-nitrogen-containing chelate resins are regenerated especially well by the method of the present invention, and the sulfur-containing chelate resins come next in the regenerating efficiency.

The greatest feature of this invention consists in the treating solution for liberating mercury from the chelate resin. The treating solution used in this invention is a solution of at least one sulfur compound of the general formula $$Me_nS_x$$

wherein Me is an alkali metal, barium or ammonium, $n$ is an integer of 1 or 2, $n$ is 2 when Me is an alkali metal or ammonium, and 1 when Me is barium, and $x$ is an integer of 1 to 5.

Any sulfur compounds expressed by the above general formula can be used in the present invention. Examples thereof include alkali sulfides such as $Na_2S$ or $K_2S$, alkali polysulfide such as $Na_2S_2$, $Na_2S_3$, $K_2S_4$ or $Na_2S_5$, ammonium sulfide, ammonium polysulfide, barium sulfide, or barium polysulfides such as $BaS_3$ or $BaS_4$. The use of the alkali sulfides and alkali polysulfides brings about especially good results. On the other hand, the ammonium sulfide and ammonium polysulfide lend themselves to inferior regenerating efficiency because of insufficient pH adjustment, but by adjusting the pH with addition of alkali separately, they can also be used effectively in the regeneration procedure.

It is not entirely clear by what action the sulfur compound of the above-given general formula liberates mercury adsorbed to chelate resins, but it is assumed that mercury is first converted to mercury sulfide, and then liberated in the form of soluble mercury.

Another feature of the present invention consists in the mode of using the sulfur compound. It is essential in the present invention that the sulfur compound solution be used while it is maintained at a pH of at least 11.0. The effect of liberating adsorbed mercury from the chelate resin increases with increasing pH value of the sulfur compound solution, and the use of the sulfur compound solution having a pH of at least 13 is especially preferred. If the pH of the solution is less than 11.0, the liberation of the adsorbed mercury is insufficient, and the regenerated chelate resin cannot be reused on an industrial basis.

The relation between the pH of a sodium sulfide solution and the percent recovery of mercury from the chelate resin is shown in the accompanying figure on the basis of the results obtained in Example 1.

A method of regenerating an anion exchange resin having mercury adsorbed thereto by contracting it with an aqueous solution of an alkali sulfide is known. However, the form of mercury adsorbed to the anion exchange resin differs considerably from that of mercury adsorbed to the chelate resin. Since it has previously been considered impossible to liberate mercury adsorbed to chelate resins, it was unexpected that mercury adsorbed to chelate resins could be liberated by using alkali sulfides.

Even when the anion exchange resin which has ion-exchanged mercury is treated with a sulfide solution having a pH of more than 13, the ion-exchange ability of the regenerated anion exchange resin is regained only to an extent of 60%, and such a resin is difficult to reuse commercially. On the other hand, in the present invention, the mercury-adsorbing ability of the chelate resin is regained almost 100%, and the regenerated resin can be commercially reused with good results.

It is very surprising therefore that a chelate resin having mercury adsorbed thereto can be easily regenerated by contacting the resin with a solution of a specific sulfur compound of the general formula $Me_nS_x$ given above in which all the symbols have already been defined.

The amount of the sulfur compound varies according to the amount of mercury adsorbed to the chelate resin, but generally is such that the molar ratio of the sulfur compound to the adsorbed mercury is at least 1.0, preferably at least 5.0. The concentration of the sulfur compound in the solution varies according to the type of the chelate resin used, the state of adsorption of mercury, etc., and is not critical. Generally, the concentration varies over a wide range from about 0.01 mol to the saturation concentration of the sulfur compound solution.

The operation of regenerating the mercury-adsorbed chelate resin with the sulfur compound solution is not critical, and may be performed by known methods. For example, it can be carried out by passing the sulfur compound solution through the mercury-adsorbed chelate resin, or immersing the mercury-adsorbed chelate resin in the sulfur compound solution. For commercial operation, the former method comprising passing the sulfur compound solution through the chelate resin can be advantageously utilized.

After liberation of the adsorbed mercury, the chelate resin is preferably washed with acid and then with water prior to reuse. Since the chelate resin regenerated by the method of this invention substantially regains mercury adsorbing ability of the original resin, it can be used repeatedly.

The method of this invention can be utilized without any special restriction in factories handling mercury. For example, in factories engaged in electrolysis of alkali salts by the mercury method, chelate resins are employed to remove mercury from a mercury-containing impurity mud in the brine refining process. Heretofore, the chelate resin having mercury adsorbed thereto has been discarded as such. By regenerating them in accordance with the method of this invention, the chelate resins can be repeatedly used. The solution containing mercury liberated from the chelate resin is acidified to remove excess sulfide ion as hydrogen sulfide and oxidized to solubilize mercury by a suitable oxidizing agent, e.g., alkali hypochlorite or chlorine gas. The mercury in the solution can be utilized in the mercury electrolytic process.

Accordingly, the present invention has the advantage that chelate resin having mercury adsorbed thereto can be regenerated easily and reused repeatedly, and that mercury liberated from the chelate resins can be recovered and reused.

The following non-limitative examples are given to illustrate the present invention specifically.

EXAMPLE 1

A thiourea chelate resin (product of Hokuetsu Carbon Co., Ltd.) to which mercury had been adsorbed in an amount of 104 mg./g. on an average was immersed in a 0.2 mol solution of sodium sulfide in an amount 10 molar times the amount of mercury adsorbed, followed by stirring for 3 hours at room temperature with the pH of the solution adjusted to the values indicated in Table 1 using hydrochloric acid and sodium hydroxide. Then, the amount of mercury remaining in the chelate resin was quantitatively determined by the atomic absorptionmetric method in accordance with JIS K 0102 after oxidative decomposition with nitric acid and potassium permanganate. The results are shown in Table 1. The relation between the pH of the sodium sulfide solution and the percent recovery of mercury is shown in the accompanying figure.

The chelate resin regenerated in Run No. 5 of Table 1 was packed in a column, and an aqueous solution containing 120 p.p.m. of $HgCl_2$ was passed through the column. It was found that the mercury concentration of the effluent water was 0.01 p.p.m., and the regenerated chelate resin could be sufficiently reused.

TABLE 1

| | Run No. | | | | |
|---|---|---|---|---|---|
| | 1 | 2 | 3 | 4 | 5 |
| pH | 10.0 | 11.5 | 12.0 | 13.0 | 13.4 |
| Amount of remaining mercury (mg./g.) | 70 | 41 | 19 | 0.1 | <0.1 |
| Recovery of mercury (percent) | 33 | 61 | 82 | 99.9 | 100 |

EXAMPLE 2

The same procedure as in Example 1 was repeated using various chelate resins having mercury adsorbed thereto in an amount of 104 mg./g. on an average and various sulfide solutions shown in Table 2. The results obtained are shown in Table 2.

TABLE 2

| Run No. | Sulfides | Mol ratio of sulfide to adsorbed Hg | pH of the sulfide solution | Percent recovery of the adsorbed Hg |
|---|---|---|---|---|
| 1 | $Na_2S$ | 20 | 11 | 10 |
| 2 | $Na_2S$ | 20 | 13 | 100 |
| 3 | $Na_2S$ | 2 | 13 | 53 |
| 4 | $K_2S$ | 10 | 13 | 100 |
| 5* | $K_2S$ | 20 | 12 | 85 |
| 6* | $K_2S$ | 20 | 13 | 100 |
| 7 | BaS | 20 | 13 | 100 |
| 8 | $Na_2S_2$ | 10 | 12 | 62 |
| 9 | $Na_2S_2$ | 10 | 13 | 100 |
| 10** | $K_2S_2$ | 20 | 12 | 81 |
| 11** | $K_2S_2$ | 20 | 13 | 100 |
| 12 | $BaS_2$ | 20 | 12 | 83 |
| 13 | $BaS_2$ | 10 | 13 | 100 |
| 14 | $K_2S_4$ | 20 | 13 | 100 |
| 15 | $Na_2S_5$ | 10 | 13 | 100 |
| 16 | $K_2S_5$ | 10 | 13 | 100 |

In Runs Nos. 1 to 4, 7 to 9 and 12 to 16, the same thiourea chelate resin as used in Example 1 was used. In Run Nos. 5 and 6 (*), a dithiocarbamate resin was used, and in Runs Nos. 10 and 11 (**), an iminodiacetate resin (CR–10, product of Mitsubishi Chemical Co., Ltd.) was used.

Each of the chelate resins regenerated in Example 2 was packed in a column, and an aqueous solution containing 120 p.p.m. of $HgCl_2$ was passed through the column. It was found that the mercury concentration in the effluent water was less than 0.02 p.p.m. and the regenerated resin could be sufficiently reused.

EXAMPLE 3

A thiourea chelate resin (product of Hokuetsu Carbon Co., Ltd.) which was the same as one used in Example 1 but did not contain mercury adsorbed thereto was packed in a column, and an aqueous solution of HgCl₂ of various concentrations was passed through the column. The amount of mercury contained in the effluent from the bottom of the column was measured. Then, the chelate resin was saturated with mercury using an aqueous solution of HgCl₂ having a mercury concentration of about 10 g./liter. Mercury was adsorbed to the chelate resin in an amount of 98 mg./g. on an average.

Mercury was eluted using an aqueous solution of sodium sulfide in an amount of 10 molar times the amount of the adsorbed mercury (pH 13), and the chelated resin was washed with dilute hydrochloric acid and then with water. This procedure was repeated five times, and the results obtained are shown in Table 3.

TABLE 3

| Number of operations | Recovery of mercury (percent) | Mercury concentration in— | |
|---|---|---|---|
| | | HgCl₂ solution (p.p.m.) | The effluent (p.p.m.) |
| 1 | 100 | 120 | 0.01 |
| 2 | 100 | 120 | 0.02 |
| 3 | 100 | 15 | 0.02 |
| 4 | 100 | 15 | 0.01 |
| 5 | 100 | 15 | 0.01 |

It can be seen from the results shown in Table 3 that by employing the method of this invention, the chelate resin can be repeatedly reused.

EXAMPLE 4

In a column having an inner diameter of about 1 cm., 11 cc. of a thiourea chelate resin (product of Hokuetsu Carbon Co., Ltd.) were packed, and a 1% sodium chloride solution containing HgCl₂ in an amount of 15 p.p.m. as Hg was poured down from the top of the column and passed therethrough. The amount of the solution which passed through the column (calculated as the times the amount of the chelate resin) and the concentration of mercury remaining in the effluent solution were measured.

In the same way, the above procedure was repeated using a strongly basic ion exchange resin containing a functional group of the formula

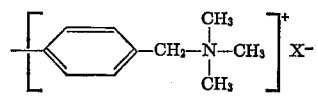

The results obtained are shown in Table 4 below.

TABLE 4

| Amount of the HgCl₂-containing sodium chloride solution (times the amount of the chelate resin) | 10 | 1,000 | 2,000 | 3,000 | 4,000 | 5,000 | 6,000 | 7,000 |
|---|---|---|---|---|---|---|---|---|
| Concentration of the remaining Hg (p.p.m.) in the effluent in the case of using the chelate resin | <0.001 | <0.001 | 0.002 | 0.003 | 0.004 | 0.005 | 0.007 | 0.008 |
| Concentration of the remaining Hg (p.p.m.) in the effluent in the case of using the ion exchange resin | 0.02 | 0.035 | 0.050 | 0.060 | 0.065 | 0.070 | 0.075 | 0.080 |

It is seen from the results that the chelate resin has a far higher mercury removing efficiency than the strongly basic ion exchange resin.

What is claimed is:

1. A method of regenerating a chelate resin having mercury adsorbed thereto, which comprises contacting said chelate resin, with an aqueous solution with a pH of at least 11, of at least one sulfur compound of the formula $$Me_nS_x$$

wherein Me is an alkali metal, barium or ammonium $n$ is an integer of 1 or 2, $n$ being 2 when Me is an alkali metal or ammonium and 1 when Me is barium, and $x$ is an integer of 1 to 5, to thereby liberate the adsorbed mercury from said chelate resin.

2. The method of claim 1 wherein said chelate resin is selected from the group consisting of thiourea resins, thiol resins, dithiocarbamate resins and imino diacetate resins.

3. The method of claim 1 wherein the pH of said solution is at least 13.0.

References Cited
UNITED STATES PATENTS
3,645,981   2/1972   Bonner, Jr. _____ 260—77.5 CH DONALD E. CZAJA, Primary Examiner M. I. MARQUIS, Assistant Examiner U.S. Cl. X.R.
260—69 F, 77.5 CH, 78 A, 79.1

UNITED STATES PATENT OFFICE
CERTIFICATE OF CORRECTION

Patent No. 3,790,535              Dated February 5, 1974

Inventor(s)    Kensuke Motani et al.

It is certified that error appears in the above-identified patent and that said Letters Patent are hereby corrected as shown below:

Column 1, insert the following foreign priority data:

-- Oct. 9, 1971   Japan........49-79132 --.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*